(12) United States Patent
Zhang et al.

(10) Patent No.: US 10,841,583 B2
(45) Date of Patent: Nov. 17, 2020

(54) CODING UNIT DEPTH DETERMINING METHOD AND APPARATUS

(71) Applicant: TENCENT TECHNOLOGY (SHENZHEN) COMPANY LIMITED, Shenzhen (CN)

(72) Inventors: Hongshun Zhang, Shenzhen (CN); Sixin Lin, Shenzhen (CN); Ximing Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/366,595

(22) Filed: Mar. 27, 2019

(65) Prior Publication Data

US 2019/0222842 A1 Jul. 18, 2019

Related U.S. Application Data

(63) Continuation of application No. PCT/CN2017/115175, filed on Dec. 8, 2017.

(30) Foreign Application Priority Data

Apr. 21, 2017 (CN) .......................... 2017 1 0266798

(51) Int. Cl.
*H04N 19/52* (2014.01)
*H04N 19/119* (2014.01)
(Continued)

(52) U.S. Cl.
CPC ......... *H04N 19/119* (2014.11); *H04N 19/103* (2014.11); *H04N 19/105* (2014.11);
(Continued)

(58) Field of Classification Search
CPC ...... H04N 19/119; H04N 19/96; H04N 19/82; H04N 19/103; H04N 19/86; H04N 19/61;
(Continued)

(56) References Cited

U.S. PATENT DOCUMENTS 8,913,662 B2 * 12/2014 Karczewicz ......... H04N 19/137
375/240.13
8,964,852 B2 * 2/2015 Chong .................. H04N 19/96
375/240.24
(Continued)

FOREIGN PATENT DOCUMENTS

CN 102420990 A 4/2012
CN 103067704 A 4/2013
(Continued)

OTHER PUBLICATIONS

Kim et al, Adaptive PU mode estimation algorithm for HEVC encoder (Year: 2015).*
(Continued)

*Primary Examiner* — Shan E Elahi
(74) *Attorney, Agent, or Firm* — Anova Law Group, PLLC

(57) ABSTRACT

A coding unit (CU) depth determining method includes determining a residual coefficient of a current optimal mode of a target CU, respectively obtaining coding information features of the target CU corresponding to a specific frame type and coding information features of a neighboring coding tree unit (CTU) corresponding to the specific frame type of a CTU in which the target CU is located, to form prediction feature vector samples, and inputting the prediction feature vector samples to a pre-trained predictive model corresponding to the specific frame type, to obtain a prediction result.

18 Claims, 7 Drawing Sheets

(51) Int. Cl.
*H04N 19/105* (2014.01)
*H04N 19/172* (2014.01)
*H04N 19/139* (2014.01)
*H04N 19/61* (2014.01)
*H04N 19/86* (2014.01)
*H04N 19/103* (2014.01)
*H04N 19/82* (2014.01)
*H04N 19/96* (2014.01)

(52) U.S. Cl.
CPC ......... *H04N 19/139* (2014.11); *H04N 19/172* (2014.11); *H04N 19/52* (2014.11); *H04N 19/61* (2014.11); *H04N 19/82* (2014.11); *H04N 19/86* (2014.11); *H04N 19/96* (2014.11)

(58) Field of Classification Search
CPC .... H04N 19/139; H04N 19/52; H04N 19/172; H04N 19/105; H04N 19/159; H04N 19/176
USPC .................................................. 375/240.02
See application file for complete search history.

(56) References Cited

U.S. PATENT DOCUMENTS

| | | | |
|---|---|---|---|
| 2007/0019732 A1 | 1/2007 | Huang et al. | |
| 2012/0177118 A1* | 7/2012 | Karczewicz | H04N 19/463 375/240.13 |
| 2013/0107952 A1* | 5/2013 | Coban | H04N 19/46 375/240.12 |
| 2014/0185682 A1* | 7/2014 | Chen | H04N 19/573 375/240.16 |
| 2014/0192885 A1* | 7/2014 | Seregin | H04N 19/52 375/240.16 |

FOREIGN PATENT DOCUMENTS

| | | |
|---|---|---|
| CN | 103533349 A | 1/2014 |
| CN | 103947207 A | 7/2014 |
| CN | 104853191 A | 8/2015 |
| CN | 105306947 A | 2/2016 |
| CN | 105430407 A | 3/2016 |
| CN | 105721865 A | 6/2016 |
| CN | 106162167 A | 11/2016 |
| KR | 20140056599 A | 5/2014 |

OTHER PUBLICATIONS

Liu et al, A texture complexity based fast prediction unit size selection algorithm for HEVC intra coding (Year: 2014).*
The World Intellectual Property Organization (WIPO) International Search Report for PCT/CN2017/115175 dated Feb. 26, 2018, 5 pages (including translation).
Cheng-Tao Zhou et al., "Fast coding unit size decision for HEVC", journal of zhejiang University (Engineering Science), Aug. 31, 2014, pp. 1451-1460 10 Pages.
Liquan Shen et al., "Fast CU Size Decision and Mode Decision Algorithm for HEVC Intra Coding", IEEE Transactions on Consumer Electronics, 59(1), Apr. 4, 2013, pp. 207-213 7 Pages.
The State Intellectual Property Office of the People's Republic of China (SIPO) Office Action 1 for 201710266798.8 dated Jun. 3, 2020, 11 Pages (including translation).
Xiaolin Shen et al., "CU splitting early termination based on weighted SVM," Eurasip Journal on Image and Video Processing, Jan. 31, 2013 11 Pages.
The European Patent Office (EPO) The Extended European Search Report for 17906258.3 dated Mar. 6, 2020 6 Pages.
Xiaolin Shen et al: "CU splitting early termination based on weighted SVM", Eurasip Journal on Image and Video Processing, vol. 2013, No. 1, Jan. 1, 2013 (Jan. 1, 2013 ), p. 4, sections 3.1, 3.2, 3.3.1, 3.3.2 Total 11 pages.
Yun Zhang et al: "Machine Learning-Based Coding Unit Depth Decisions for Flexible Complexity Allocation in High Efficiency Video Coding", IEEE Transactions on Image Processing, vol. 24, No. 7, Jul. 1, 2015 (Jul. 1, 2015 ), pp. 2225-2238, section III 14 pages.
Zhaoqing Pan et al: "Fast Coding Tree Unit depth decision for high efficiency video coding", 2014 IEEE International Conference on Image Processing (ICIP), IEEE, Oct. 27, 2014 (Oct. 27, 2014), pp. 3214-3218, sections 3.1, 3.3 5 pages.
Korean Intellectual Property Office (KIPO) Office Action 1 for 10-2019-7027603 dated Sep. 24, 2020 13 Pages (including translation).
Xiaolin Shen et al. CU splitting early termination based on weighted SVM. Eurasip Journal on Image and Video Processing, vol. 2013, No. 1, Jan. 9, 2013, pp. 1-11. 11 pages.

* cited by examiner

CODING UNIT DEPTH DETERMINING METHOD AND APPARATUS

RELATED APPLICATIONS

This application is a continuation application of PCT Patent Application No. PCT/CN2017/115175, filed on Dec. 8, 2017, which claims priority to Chinese Patent Application No. 2017102667988, entitled "CODING UNIT DEPTH DETERMINING METHOD AND APPARATUS" filed on Apr. 21, 2017, the entire contents of both of which are incorporated herein by reference.

FIELD OF TECHNOLOGY

This application relates to the field of video coding technologies, and more specifically, to a coding unit (CU) depth determining method and apparatus.

BACKGROUND OF THE DISCLOSURE

In recent years, digital videos have become dominant media content in many consumer applications, and more people prefer videos with higher resolution and better quality. In view of such requirements, High Efficiency Video Coding (HEVC)—a new generation of international video coding standard—starts to be formulated. Compared with the H.264/AVC standard, HEVC provides higher coding compression performance.

A coding process of the HEVC coding standard is described with reference to FIG. 1. A prediction value is obtained after intra-frame prediction or inter-frame prediction is performed on a frame of image in an original video sequence together with a cached reference frame. Subtraction is performed between the prediction value and an input video frame to obtain a residual. A residual coefficient is obtained after discrete cosine transform (DCT) and quantization are performed on the residual. Then, the residual coefficient is sent to an entropy coding module for coding, and a video stream is output. In addition, after dequantization and inverse transform are performed on the residual coefficient, a residual value of a re-constructed image is obtained. The residual value of the re-constructed image is added to the intra-frame or inter-frame prediction value, to obtain the re-constructed image. After deblocking filter and loop filter are performed on the re-constructed image, a re-constructed frame is obtained. The re-constructed frame is used as a reference frame of a next frame of image and added to a reference frame sequence.

In the HEVC standard, an input video frame is divided into a series of coding tree units (CTUs). During intra-frame or inter-frame prediction, each CTU is divided, starting from a largest coding unit (LCU), into one or more layers, each layer being divided into coding units (CUs) with different sizes in a form of a quadtree. A layer of depth 0 is the LCU, and usually has a size of 64*64, and layers with depths 1 to 3 are respectively 32*32, 16*16, and 8*8. To obtain utmost coding performance, when selecting an utmost depth division mode for a CU (also called a CU block), the existing HEVC adopts a traversal manner. In this manner, a rate-distortion cost (rdcost) is calculated for all modes having different depths for the CU block, and then comparison is performed layer by layer, to select a mode with a smallest rdcost. FIG. 2 shows CU division of an optimal mode. A left figure of FIG. 2 shows a specific division manner, and a right figure shows a quadtree corresponding to the division manner in the left figure. A leaf node of the quadtree indicates whether four CU blocks in each layer needs to be further divided according to a division sequence indicated by an arrow in the left figure, 1 indicating that further division is needed, and 0 indicated that no further division is needed.

It can be learned according to FIG. 2 that, optimal modes of some CU blocks are obtained after the CU blocks are divided into one layer, so that no further division and rdcost calculation and comparison are needed. In the quadtree shown in FIG. 2, a node value of the second CU block in the first layer is 0, indicating that no further division is needed. Apparently, the existing traversal algorithm has an extremely long coding prediction process and needs to consume a large quantity of calculation resources.

SUMMARY

In view of this, this application provides a CU depth determining method and apparatus, to resolve a problem of long coding prediction time and consumption of a large quantity of calculation resources when an existing traversal method for determining a CU depth is used.

One aspect of this application provides a CU depth determining method. The method includes determining, by a computing device, a residual coefficient of a current optimal mode of a to-be-processed CU; and respectively obtaining, when the residual coefficient is not 0, coding information features of the to-be-processed CU corresponding to a specific frame type and coding information features of a neighboring coding tree unit (CTU) corresponding to the specific frame type of a CTU in which the to-be-processed CU is located, to form prediction feature vector samples. The method also includes inputting, by the computing device, the prediction feature vector samples to a pre-trained predictive model corresponding to the specific frame type, to obtain a prediction result output from the predictive model. The prediction result indicates whether depth division needs to be performed on the to-be-processed CU. The predictive model is obtained through pre-training by using training samples marked with classification results, and the training samples comprise coding information features corresponding to the specific frame type.

Another aspect of this application provides a CU depth determining apparatus, including a memory and a processor coupled to the memory. The processor is configured to: determine a residual coefficient of a current optimal mode of a to-be-processed CU; and respectively obtain, when the residual coefficient is not 0, coding information features of the to-be-processed CU corresponding to a specific frame type and coding information features of a neighboring coding tree unit (CTU) corresponding to the specific frame type of a CTU in which the to-be-processed CU is located, to form prediction feature vector samples. The processor is also configured to input the prediction feature vector samples to a pre-trained predictive model corresponding to the specific frame type, to obtain a prediction result output from the predictive model. The prediction result indicates whether depth division needs to be performed on the to-be-processed CU. The predictive model is obtained through pre-training by using training samples marked with classification results, and the training samples comprise coding information features corresponding to the specific frame type.

Another aspect of embodiments of this application further provides a non-transitory computer readable storage medium that stores computer program instructions executable by at least one processor. The computer program instructions cause the at least one processor to perform:

determining a residual coefficient of a current optimal mode of a to-be-processed CU; and respectively obtaining, when the residual coefficient is not 0, coding information features of the to-be-processed CU corresponding to a specific frame type and coding information features of a neighboring coding tree unit (CTU) corresponding to the specific frame type of a CTU in which the to-be-processed CU is located, to form prediction feature vector samples. The computer program instructions also cause the at least one processor to perform: inputting the prediction feature vector samples to a pre-trained predictive model corresponding to the specific frame type, to obtain a prediction result output from the predictive model. The prediction result indicates whether depth division needs to be performed on the to-be-processed CU. The predictive model is obtained through pre-training by using training samples marked with classification results, and the training samples comprise coding information features corresponding to the specific frame type.

By using the CU depth determining method provided in one embodiment of this application, the predictive model is pre-trained by using the training samples marked with classification results. The training sample includes coding information features corresponding the specific frame type. When it is determined that the residual coefficient of the current optimal mode of the to-be-processed CU is not 0, it indicates that the to-be-processed CU is a non-skip CU and coding depth prediction needs to be performed. Coding information features of the specific frame type are obtained from the to-be-processed CU and the neighboring CTU of the CTU in which the to-be-processed CU is located, to form the prediction feature vector samples. The prediction feature vector samples are input to the predictive model, and the predictive model (e.g., trained by machine learning algorithm) is used to predict whether depth division needs to be performed on the to-be-processed CU. In this application, when the prediction result indicates that depth division does not need to be performed on the to-be-processed CU, depth division and rdcost calculation and comparison do not need to be performed on the to-be-processed CU. Compared with the existing technology, coding prediction time of this application is significantly reduced, calculation resources are reduced, and calculation complexity is lowered.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Figure 1:
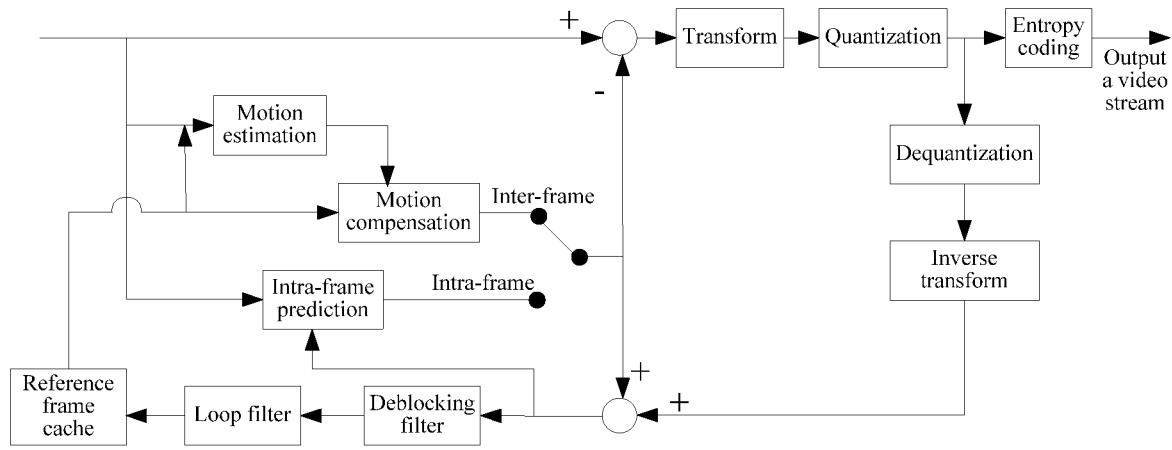
FIG. 1 is a schematic diagram of an HEVC coding framework.
Figure 2:
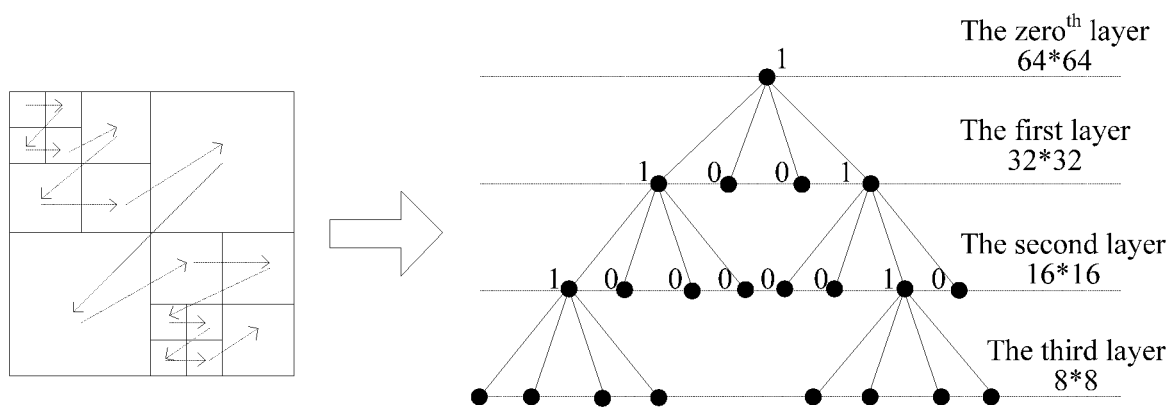
FIG. 2 is a schematic diagram of CU division of an optimal mode.
Figure 3:
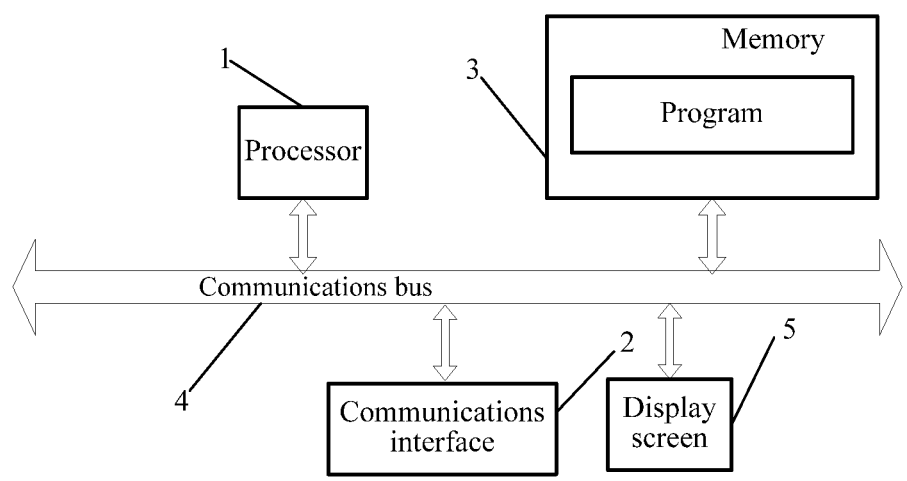
FIG. 3 is a schematic diagram of a hardware structure of a computing device according to an embodiment of this application.

An embodiment of this application provides a CU depth determining solution. The solution may be applied to a video coder (e.g., that implements video compression), the video coder being implemented based on any proper computing device such as a sever, a PC, etc. A hardware structure of the server may be a processing device such as a computer or a notebook. As used herein, the video decoder may compress a video comprising a plurality of video frames. The video frames may have different frame types, such as Intra-coded (I) frames, Predicted-coded (P) frames, and Bi-directional predicted coded (B) frames. Different frame types may correspond to different processing algorithms during video compression. I frames, also called key frames, are the least compressible but don't require other video frames to decode. P frames can use data from previous frames to decompress and are more compressible than I frames. B frames can use both previous and forward frames for data reference to get the highest amount of data compression. The hardware structure of the server is described first before the CU depth determining method in this application is described. As shown in FIG. 3, the computing device may include:

a processor 1, a communications interface 2, a memory 3, a communications bus 4, and a display screen 5.

Communication among the processor 1, the communications interface 2, the memory 3 and the display screen 5 is implemented through the communications bus 4.

Figure 4:
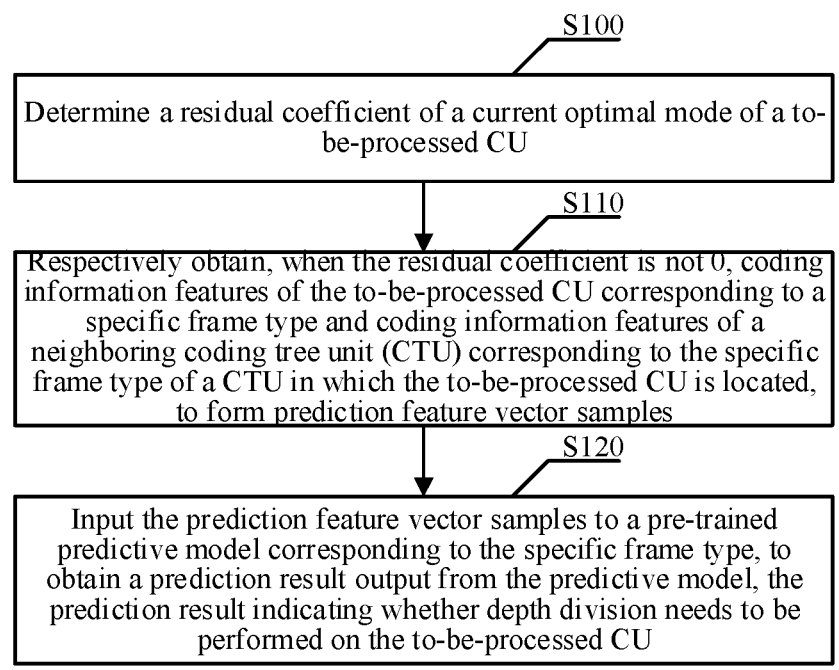
FIG. 4 is a flowchart of a CU depth determining method according to an embodiment of this application.

Next, the CU depth determining method in this application is described with reference to the hardware structure of the computing device. As shown in FIG. 4, the method includes:

Step S100: Determine a residual coefficient of a current optimal mode of a to-be-processed CU.

Specifically, for the to-be-processed CU, a list of candidate motion vectors (mv) is constructed according to a standard protocol, and then each mv in the list is traversed and motion compensation is performed, to obtain a prediction value. Next, a sum of squared differences (SSD) between the prediction value and an original pixel of the to-be-processed CU is calculated, a quantity of bits of an index of a corresponding mv is estimated, and a mv corresponding to a smallest rdcost is an mv of an optimal mode, where $$rd\text{cost}=SSD+\lambda*bit (\lambda \text{ being a constant})$$

Further, transformation and quantization are performed on an SSD corresponding to the optimal mv, to obtain a residual coefficient. The to-be-processed CU is a skip block if the residual coefficient is 0; otherwise, the to-be-processed CU is a merge block.

It can be understood that, the residual coefficient being 0 indicates that the to-be-processed CU is a skip block, and CU division may be directly ended; otherwise, it indicates that division prediction needs to be performed on the to-be-processed CU.

During specific implementation, a to-be-processed video frame may be pre-stored in the memory 3 by using the communications interface 2. During coding, the processor 1 obtains, by using the communications bus 4, the to-be-processed video frame stored in the memory, and divides the video frame into a plurality of CUs, to determine a to-be-processed CU and determine a residual coefficient of a current optimal mode of the to-be-processed CU.

Optionally, the communications interface 2 may be an interface of a communications module, for example, an interface of a GSM module.

Optionally, the processor 1 may be a central processing unit (CPU) or an application-specific integrated circuit (ASIC) or may be configured as one or more integrated circuits for implementing the embodiments of this application.

Step S110: Respectively obtain, when the residual coefficient is not 0, coding information features of the to-be-processed CU corresponding to a specific frame type and coding information features of a neighboring CTU corresponding to the specific frame type of a CTU in which the to-be-processed CU is located, to form prediction feature vector samples. In some embodiments, as used herein, coding information features corresponding to a specific frame type may refer to coding information features of a CU or a CTU that belongs to a video frame having the specific frame type.

Specifically, the types of the obtained coding information features in this step are the same as a type of a training sample used during training of a predictive model. Coding information feature templates of various types may be preset in this application, and the coding information features are obtained according to the coding information feature templates from the to-be-processed CU and the neighboring CTU of the CTU in which the to-be-processed CU is located, to form the prediction feature vector samples by using the obtained coding information features. The coding information features are obtained from the to-be-processed CU and the neighboring CTU of the CTU in which the to-be-processed CU is located.

During specific implementation, the coding information feature templates of various types may be preset in the memory 3, and the processor 1 may obtain the coding information features according to the coding information feature templates from the to-be-processed CU and the neighboring CTU of the CTU in which the to-be-processed CU is located, to form the prediction feature vector samples.

Step S120: Input the prediction feature vector samples to a pre-trained predictive model, to obtain a prediction result output from the predictive model, the prediction result being used for indicating whether depth division needs to be performed on the to-be-processed CU.

The predictive model is obtained through pre-training by using training samples marked with classification results (e.g., a classification result indicating whether depth division needs to be performed for a CU in a training sample), and the training samples include coding information features corresponding to the specific frame type. In some embodiments, the predictive model may be pre-trained using one computing device (e.g., one or more offline servers or terminals with strong capabilities) and the trained predictive model may be loaded and used by another computing device (e.g., an online server or computing terminal that does not require as much computing resource as the one used for model training) for real-time or fast video encoding/compression.

During specific implementation, the predictive model may be pre-stored in the memory 3. During prediction, the processor 1 inputs the prediction feature vector samples to the pre-trained predictive model, to obtain the prediction result output from the predictive model and display the prediction result by using the display screen 5.

The predictive model may be a machine learning model such as a support vector machine (SVM) model or a neural network model.

By using the CU depth determining method provided in one embodiment of this application, the predictive model is pre-trained by using the training samples marked with the classification results. The training samples include coding information features corresponding to the specific frame type. When it is determined that the residual coefficient of the current optimal mode of the to-be-processed CU is not 0, it indicates that the to-be-processed CU is a non-skip CU and coding depth prediction needs to be performed. Coding information features of the specific frame type are obtained from the to-be-processed CU and the neighboring CTU of the CTU in which the to-be-processed CU is located, to form the prediction feature vector samples. The prediction feature vector samples are input to the predictive model, and the machine learning predictive model is used to predict whether depth division needs to be performed on the to-be-processed CU. In this application, when the prediction result indicates that depth division does not need to be performed on the to-be-processed CU, depth division and rdcost calculation and comparison do not need to be performed on the to-be-processed CU. Compared with the existing technology, coding prediction time of this application is significantly reduced, calculation resources are reduced, and calculation complexity is lowered.

Optionally, because the ratio of I frames in an entire coding process is relatively small, in this application, depth determining may be performed on only a to-be-processed CU belonging to a non-I-frame video image. That is, the to-be-processed CU belongs to a non-I-frame video image (i.e., belongs to a video frame whose specific frame type is not I-frame type). In some embodiments, a non-I-frame video image is either a P-frame or a B-frame.

Figure 5:
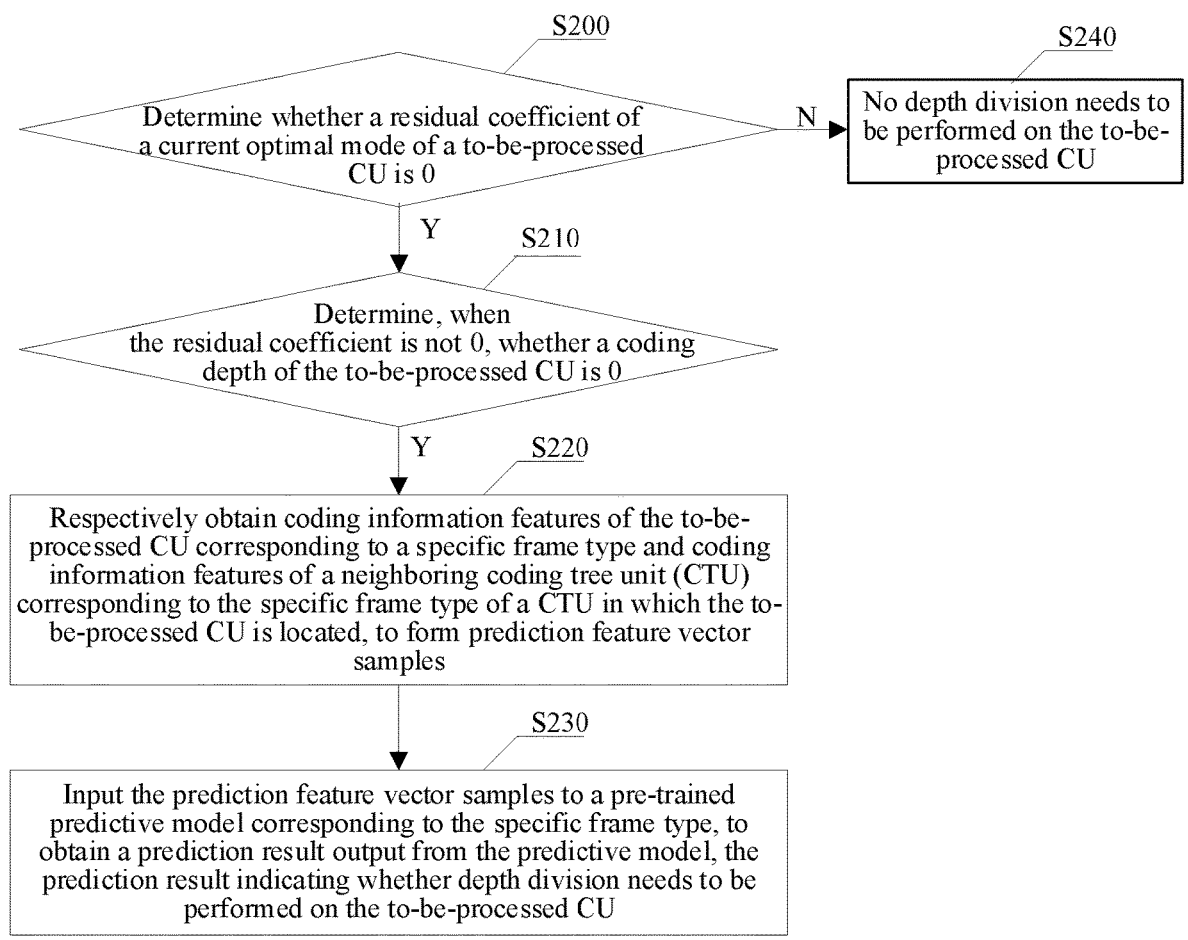
FIG. 5 is a flowchart of another CU depth determining method according to an embodiment of this application.

In another embodiment of this application, another CU depth determining method is described. As shown in FIG. 5, the method includes:

Step S200: Determine whether a residual coefficient of a current optimal mode of a to-be-processed CU is 0.

It can be understood that, the residual coefficient being 0 indicates that the to-be-processed CU is a skip block, and CU division determination may be directly ended (Step S240). In other words, no depth division needs to be performed on the to-be-processed CU. Otherwise, it indicates that division prediction needs to be performed on the to-be-processed CU and the process moves on to Step S210.

Step S210: Determine, when the residual coefficient is not 0, whether a coding depth of the to-be-processed CU is 0, and perform step S220 if the coding depth of the to-be-processed CU is 0.

Specifically, if the coding depth of the to-be-processed CU is 0, it indicates that the to-be-processed CU is an LCU, that is, a CTU is not divided.

In one embodiment, the following operation of predicting, by using a predictive model, whether depth division needs to be performed on the to-be-processed CU is performed only when it is determined that the coding depth of the to-be-processed CU is 0.

It should be noted that, for a to-be-processed CU whose coding depth is not 0, calculation during prediction performed by using a predictive model is relatively complex. Therefore, in this application, prediction may be performed in another manner. For details, refer to the relevant descriptions below of the specification.

Step S220: Respectively obtain coding information features of the to-be-processed CU corresponding to a specific frame type and coding information features of a neighboring CTU corresponding to the specific frame type of a CTU in which the to-be-processed CU is located, to form prediction feature vector samples.

Step S230: Input the prediction feature vector samples to a pre-trained predictive model, to obtain a prediction result output from the predictive model, the prediction result being used for indicating whether depth division needs to be performed on the to-be-processed CU.

The predictive model is obtained through pre-training by using training samples marked with classification results, and the training samples include coding information features corresponding to the specific frame type.

Compared with the previous embodiment, in one embodiment, a judging condition is added for predicting the coding depth by using the predictive model. To be specific, the process of performing prediction by using the model is performed only when the coding depth of the to-be-processed CU is 0. For a to-be-processed CU whose coding depth is not 0, calculation during prediction performed by using a predictive model is relatively complex. Therefore, in this application, prediction may be performed in another manner. For details, refer to the relevant descriptions below of the specification.

In another embodiment of this application, the predictive model is described.

Because error accumulation periods of B frames and P frames in a video stream are different, to make the prediction result of the predictive model more accurate, it can be set in this application that the predictive model includes a P-frame predictive model and a B-frame predictive model.

A training sample used during pre-training of the P-frame predictive model includes coding information features corresponding to the specific frame type extracted from a CU belonging to a P-frame video image (i.e., the specific frame type of the video frame is P-frame).

A training sample used during pre-training of the B-frame predictive model includes coding information features corresponding to the specific frame type extracted from a CU belonging to a B-frame video image (i.e., the specific frame type of the video frame is B-frame).

In step S230, the process of inputting the prediction feature vector samples to a pre-trained predictive model, to obtain a prediction result output from the predictive model includes the following steps during specific implementation:

S1: Determine whether a type of a video frame to which the to-be-processed CU belongs is P-frame or B-frame.

S2: If the type of the video frame to which the to-be-processed CU belongs is P-frame, input the prediction feature vector samples to the P-frame predictive model, to obtain a prediction result output from the P-frame predictive model.

S3: If the type of the video frame to which the to-be-processed CU belongs is B-frame, input the prediction feature vector sample to the B-frame predictive model, to obtain a prediction result output from the B-frame predictive model.

In this application, by predicting the to-be-processed CU belonging to the B-frame video image and the to-be-processed CU belonging to the P-frame video image by using different predictive models, accuracy of the prediction results are improved.

Next, a process of establishing the predictive model in this application is described.

1. Training Feature Obtaining

The training sample used during training of the predictive model is described first. It is defined that the to-be-processed CU is a current CU, and the neighboring CTU of the CTU in which the to-be-processed CU is located is a neighboring CTU of the current CU, so that the coding information features of the specific frame type used during training of the predictive model in this application may include:

1. A cost (curr_merge_rdcost) of the current CU.
2. A distortion (curr_merge_distortion) of the current CU.
3. A quantized coefficient (curr_qp) of the current CU.
4. A variance (curr_var) of the current CU.
5. A cost (around_rdcost) of the neighboring CTU of the current CU.
6. Depth information (around_depth) of the neighboring CTU of the current CU.

The neighboring CTU of the current CU may be an above neighboring CTU and a left neighboring CTU of the CTU in which the current CU is located. In this case, the coding information feature 5 may specifically include:

51. A cost (left_rdcost) of the left neighboring CTU of the current CU.
52. A cost (above_rdcost) of the above neighboring CTU of the current CU.

The coding information feature 6 may specifically include:

61. Depth information (left_depth) of the left neighboring CTU of the current CU.
62. Depth information (above_depth) of the above neighboring CTU of the current CU.

It should be noted that, the types of the coding information features used during training of the predictive model need to be consistent with the types of the obtained coding information features during prediction of the to-be-processed CU performed by using the model.

Based on the above, video stream sequences in different scenarios may be selected in this application. Coding information features of the foregoing various types are extracted offline for a training CU in each sequence, and whether depth division has been performed on the training CU during actual coding is recorded. If depth division has been performed on the training CU, a classification result of the training CU is marked as a first mark value. Otherwise, the classification result of the training CU is marked as a second mark value. The first mark value may be 1, and the second mark value may be −1.

Training feature vectors are formed by using the coding information features of the various types obtained from the training CU, and the training feature vectors and the classification result of the training CU form training samples.

It should be noted that, the B-frame predictive model and the P-frame predictive model are trained respectively. Therefore, coding information features of B frames and P frames are extracted respectively. In addition, in one embodiment, only a training CU with a coding depth 0 may be extracted, and the trained predictive model performs prediction on only a to-be-processed CU whose coding depth is 0.

2. Model Training

In one embodiment, an SVM model may be selected for training. The SVM model is trained offline by using third-party open-source software.

S1. Combination of training samples. Training samples with a classification result of needing depth division and training samples with a classification result of not needing depth division are obtained according to a ratio of 1:1, and are then interleaved to form an entire training sample set.

S2. Standardization of training samples. Collated training samples are standardized and are mapped to an interval of [−1,1].

The standardization of the training samples in this step aims to unify data formats, and can improve prediction accuracy.

S3. Model training. Third-party open-source software is invoked and an RBF kernel is used to respectively train B-frame training samples and P-frame training samples, to finally respectively obtain the B-frame predictive model and the P-frame predictive model, denoted as mode_B_cu64*64 and mode_P_cu64*64.

Figure 6:
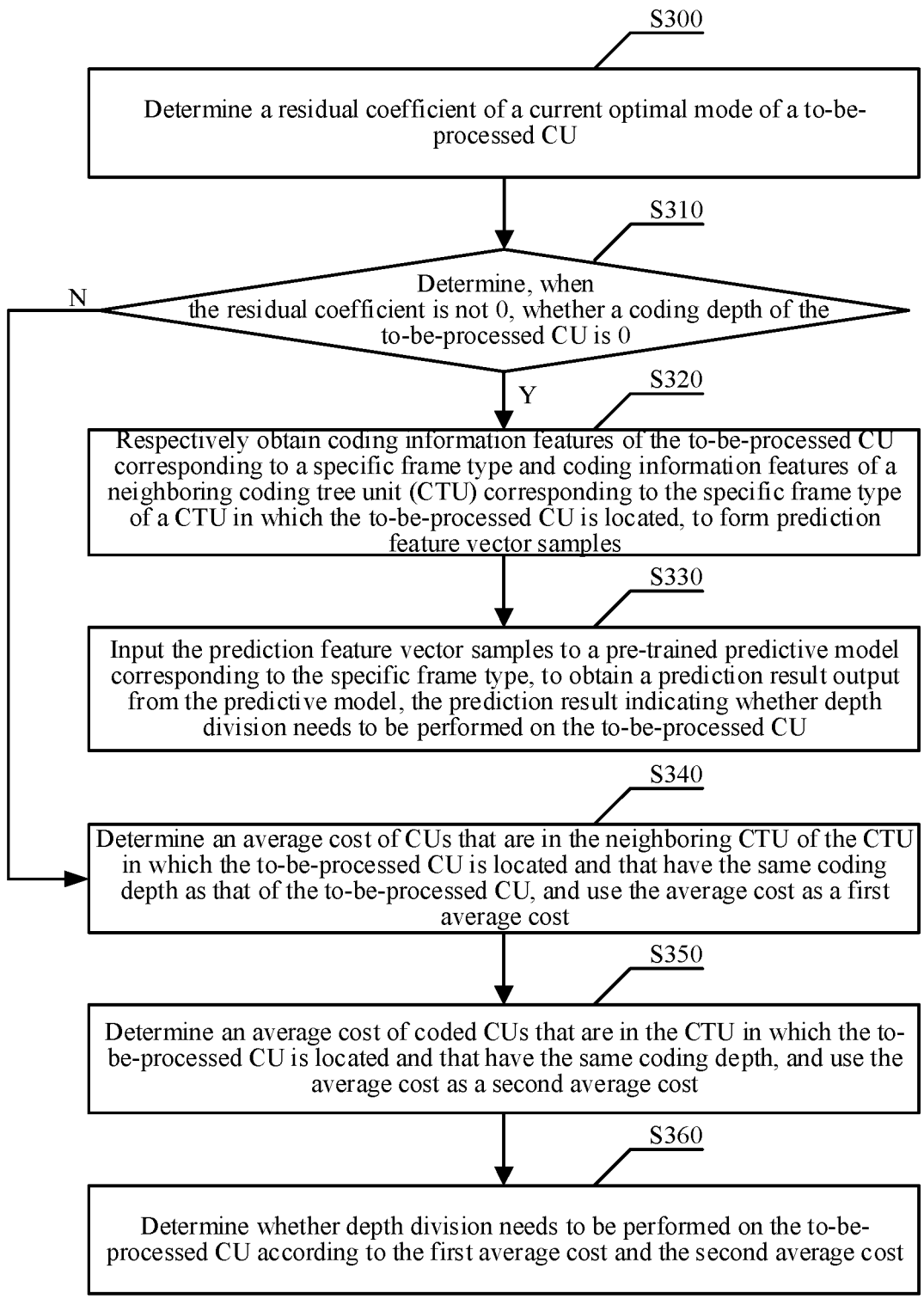
FIG. 6 is a flowchart of still another CU depth determining method according to an embodiment of this application.

In still another embodiment of this application, still another CU depth determining method is described. As shown in FIG. 6, the method includes:

Step S300: Determine a residual coefficient of a current optimal mode of a to-be-processed CU.

Step S310: Determine, when the residual coefficient is not 0, whether a coding depth of the to-be-processed CU is 0, and perform step S320 if the coding depth of the to-be-processed CU is 0; or perform step S340 if the coding depth of the to-be-processed CU is not 0.

Specifically, if the coding depth of the to-be-processed CU is 0, it indicates that the to-be-processed CU is an LCU, that is, a CTU is not divided.

In one embodiment, the following operation of predicting, by using a predictive model, whether depth division needs to be performed on the to-be-processed CU is performed when it is determined that the coding depth of the to-be-processed CU is 0. When it is determined that the coding depth of the to-be-processed CU is not 0, another method is used to predict the coding depth.

Step S320: Respectively obtain coding information features of the to-be-processed CU corresponding to a specific frame type and coding information features of a neighboring CTU corresponding to the specific frame type of a CTU in which the to-be-processed CU is located, to form prediction feature vector samples.

Step S330: Input the prediction feature vector samples to a pre-trained predictive model, to obtain a prediction result output from the predictive model, the prediction result being used for indicating whether depth division needs to be performed on the to-be-processed CU.

The predictive model is obtained through pre-training by using training samples marked with classification results, and the training samples include coding information features corresponding to the specific frame type.

Steps S300 to S330 are in a one-to-one correspondence with steps S200 to S230 in the previous embodiment, and details are not described herein again.

Step S340: Determine an average cost of CUs that are in the neighboring CTU of the CTU in which the to-be-processed CU is located and that have the same coding depth as the to-be-processed CU, and use the average cost as a first average cost.

Step S350: Determine an average cost of coded CUs that are in the CTU in which the to-be-processed CU is located and that have the same coding depth as the to-be-processed CU, and use the average cost as a second average cost.

Step S360: Determine whether depth division needs to be performed on the to-be-processed CU according to the first average cost and the second average cost.

Compared with the previous embodiments, in one embodiment, the process of predicting the coding depth of the to-be-processed CU when the coding depth of the to-be-processed CU is not 0 is added. To be specific, whether depth division needs to be performed on the to-be-processed CU is predicted according to the average cost of the CUs that are in the neighboring CTU of the CTU in which the to-be-processed CU is located and that have the same coding depth and/or according to the average cost of the coded CUs that are in the CTU in which the to-be-processed CU is located and that have the same coding depth as the to-be-processed CU. Because a pixel distribution difference of neighboring CTUs in one frame of video image is not excessively great, whether depth division needs to be performed on the to-be-processed CU may be predicted based on an average cost of CUs that are in coded neighboring coding tree unit(s) and that have the same coding depth. In this way, accuracy of a prediction result is relatively high, and depth division and rdcost calculation and comparison do not need to be performed on the to-be-processed CU. Compared with the existing technology, coding prediction time of this application is significantly reduced, calculation resources are reduced, and calculation complexity is lowered.

Figure 7:
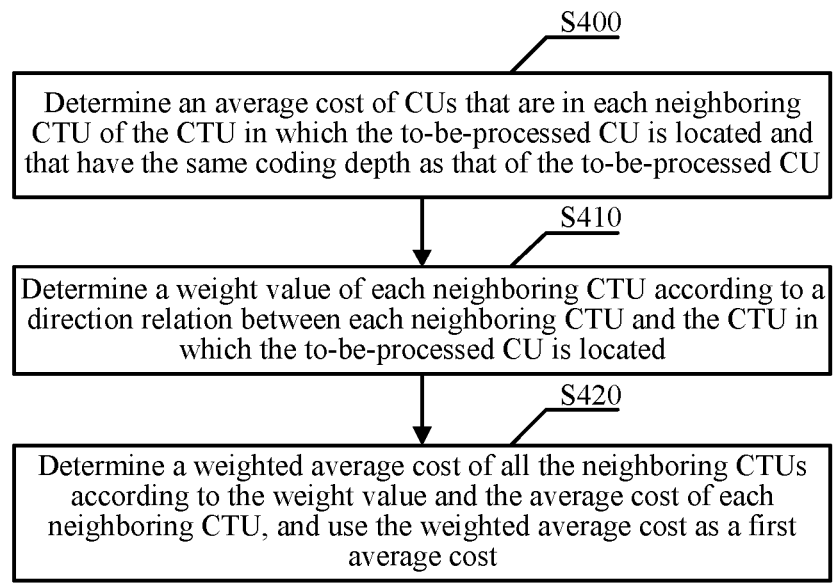
FIG. 7 is a flowchart of a first average cost determining method according to an embodiment of this application.

Further, for details of an implementation process of step S340, refer to FIG. 7, the process may include:

Step S400: Determine an average cost of CUs that are in each neighboring CTU of the CTU in which the to-be-processed CU is located and that have the same coding depth as that of the to-be-processed CU.

Step S410: Determine a weight value of each neighboring CTU according to a direction relation between each neighboring CTU and the CTU in which the to-be-processed CU is located.

Specifically, for ease of description, it is defined that the CTU in which the to-be-processed CU is located is a Current CTU, and neighboring CTUs of the Current CTU may include: a left neighboring CTU Left CTU, an above-left neighboring CTU AboveLeft CTU, an above neighboring CTU Above CTU, and an above-right neighboring CTU AboveRight CTU.

Figure 8:
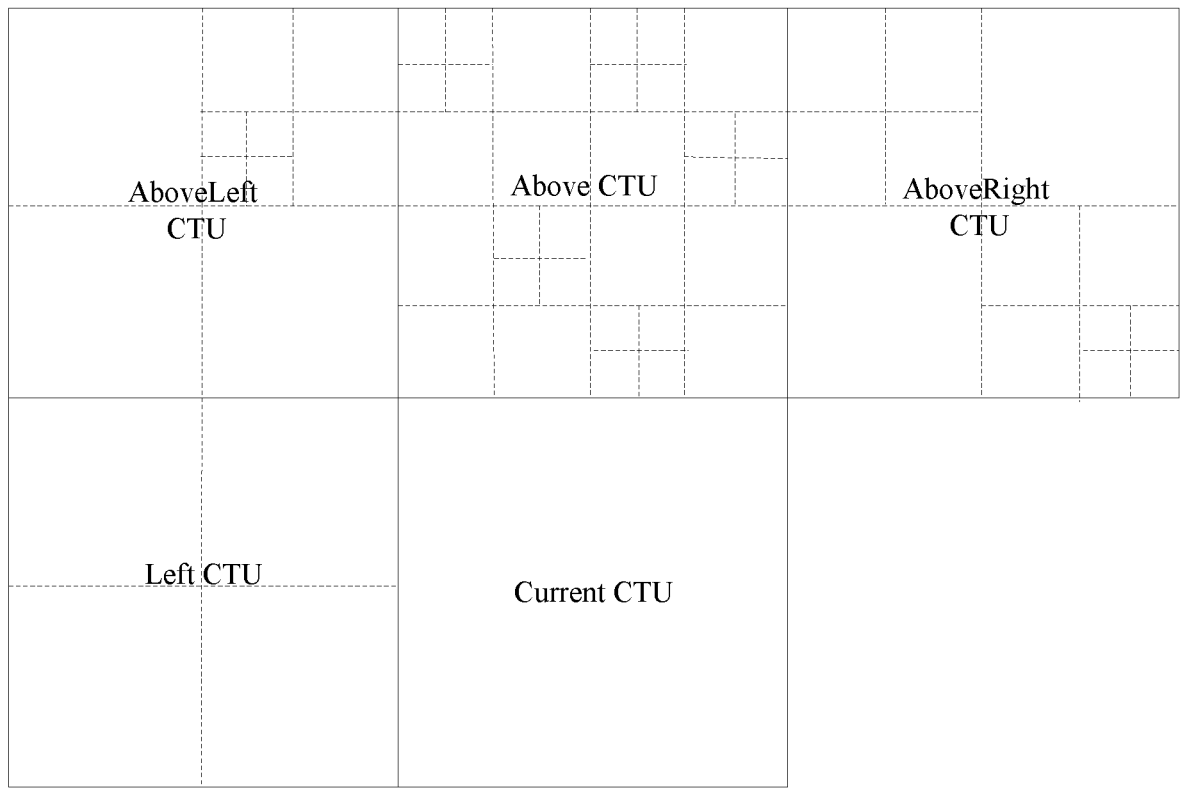
FIG. 8 is a schematic diagram of CU division of each neighboring CTU of a Current CTU.

FIG. 8 shows each neighboring CTU of the Current CTU.

It can be understood that, direction relations between the Current CTU and the neighboring CTUs are different. Therefore, weight values of the neighboring CTUs are different.

In an optional correspondence, a weight ratio of the neighboring CTUs is:

Left CTU:Above CTU:AboveLeft CTU:AboveRight CTU=2:2:1:1

Step S420: Determine a weighted average cost of all the neighboring CTUs according to the weight value and the average cost of each neighboring CTU, and use the weighted average cost as a first average cost.

Specifically, the average cost of each neighboring CTU is multiplied with the corresponding weight value, to obtain a product, then all products are added together to obtain the weighted average cost, and the weighted average cost serves as the first average cost.

A process for determining the first average cost is described by using a case shown in FIG. 8 as an example.

It is assumed that the coding depth of the to-be-processed CU is 1. It can be learned from FIG. 8 that, the Left CTU includes four CUs 32*32 with a coding depth 1, the AboveLeft CTU includes three CUs 32*32 with a coding depth 1, the Above CTU includes zero CUs 32*32 with a coding depth 1, and the AboveRight CTU includes two CUs 32*32 with a coding depth 1.

It is defined that locations of four CUs 32*32 with a coding depth 1 in a CTU are sequentially marked as 0, 1, 2, and 3 in a clockwise direction and starting from the upper left corner.

It can be learned with reference to FIG. 8 that:

left_depth1_cost=left_depth1_cost0+
    left_depth1_cost1+left_depth1_cost2+
    left_depth1_cost3;

aboveleft_depth1_cost=aboveleft_depth1_cost0+
    aboveleft_depth1_cost2+
    aboveleft_depth1_cost3;

aboveright_depth1_cost=aboveright_depth1_cost1+
    aboveright_depth1_cost2.

The first formula is used as an example for description. left_depth1_cost represents an average cost of CUs with a coding depth 1 in the left neighboring CTU, and left_depth1_cost0 represents a cost of a CU in the CUs with a coding depth 1 in the left neighboring CTU and whose location is marked as 0.

Further, a weighted average cost of CUs with a coding depth 1 in all the neighboring CTUs is:

Avg_depth1_cost=(left_depth1_cost*2+
    aboveleft_depth1_cost*1+
    aboveright_depth1_cost*1)/
    (left_depth1_num*2+aboveleft_depth1_num*1+
    aboveright_depth1_num*1).

left_depth1_num, aboveleft_depth1_num, and aboveright_depth1_num respectively represent quantities of CUs with a coding depth 1 in the left neighboring CTU, the above-left neighboring CTU and the above-right neighboring CTU.

It can be understood that, the foregoing descriptions is performed by using only the coding depth 1 as an example. Calculation manners of the coding depth 2 and the coding depth 3 are the same as the foregoing calculation manner.

Figure 9:
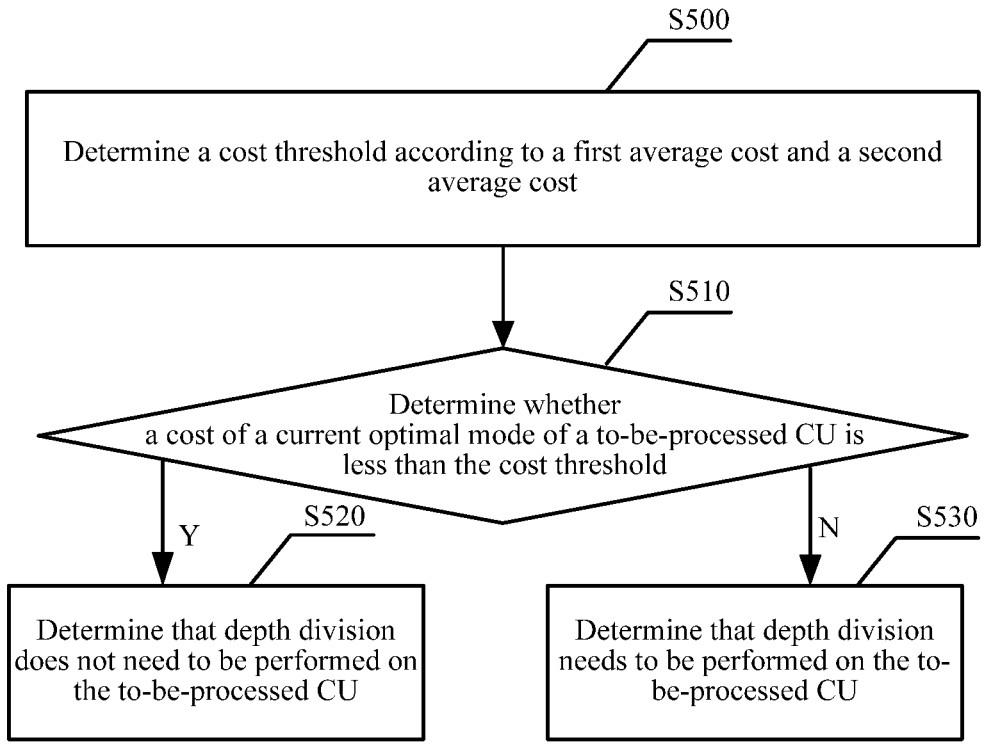
FIG. 9 is a flowchart of a method for determining whether depth division needs to be performed on a to-be-processed CU according to an embodiment of this application.

Further, an implementation process of step S360 of determining whether depth division needs to be performed on the to-be-processed CU according to the first average cost and the second average cost is described. For details, refer to FIG. 9. The process may include:

Step S500: Determine a cost threshold according to the first average cost and the second average cost.

Specifically, different weight values may be set for the first average cost and the second average cost, and then weighted summation is performed on the first average cost and the second average cost. A result may be used as the cost threshold.

Optionally, because coding of all the neighboring CTUs is completed, it may be set that the weight value of the first average cost is greater than the weight value of the second average cost.

Step S510: Determine whether a cost of the current optimal mode of the to-be-processed CU is less than the cost threshold; and if the cost of the current optimal mode of the to-be-processed CU is less than the cost threshold, perform step S520; otherwise, perform step S530.

Step S520: Determine that depth division does not need to be performed on the to-be-processed CU.

Step S530: Determine that depth division needs to be performed on the to-be-processed CU.

Specifically, if the cost of the current optimal mode of the to-be-processed CU is less than the cost threshold, in this application, it is considered that depth division does not need to be performed on the to-be-processed CU. Otherwise, it is considered that depth division needs to be performed on the to-be-processed CU.

Description is performed by further using the example of the coding depth of the to-be-processed CU being 1 with reference to FIG. 8:

It is defined that an average cost of coded CUs that are in the CTU in which the to-be-processed CU is located and that have the same coding depth is expressed as Avg_curr_CU_depth1, that is, the second average cost is expressed as Avg_curr_CU_depth1.

It is set that a ratio of the weight value of the first average cost to the weight value of the second average cost is 4:3. In this case, the cost threshold is expressed as:

Threshold_depth1=(Avg_depth1_cost*4+Avg_curr_CU_depth1*3)/(3+4)

It is defined that the cost of the current optimal mode of the to-be-processed CU is curr_cost_depth1. In this case, if it is determined that curr_cost_depth1<Threshold_depth1, it is considered that depth division does not need to be performed on the to-be-processed CU; otherwise, it is considered that depth division needs to be performed on the to-be-processed CU.

Through a verification test of the method provided in this application and the existing technology, it can be learned that compared with the existing traversal method, a coding speed of the method in this application is improved by 94% and a compression percentage is reduced by 3.1%. It can be learned that, in this application, a little reduction in the compression percentage brings great improvement in the coding speed. In this way, a coding speed of a video coder is significantly improved while calculation complexity is greatly reduced.

A CU depth determining apparatus provided in an embodiment of this application is described below. The following CU depth determining apparatus and the foregoing CU depth determining method may correspond to and serve as a reference for each other.

Figure 10:
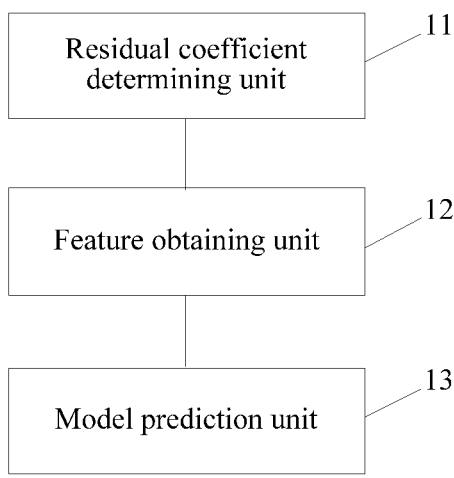
FIG. 10 is a schematic structural diagram of a CU depth determining apparatus according to an embodiment of this application.

FIG. 10 is a schematic structural diagram of a CU depth determining apparatus according to an embodiment of this application.

As shown in FIG. 10, the apparatus includes:

a residual coefficient determining unit 11, configured to determine a residual coefficient of a current optimal mode of a to-be-processed CU;

a feature obtaining unit 12, configured to respectively obtain, when the residual coefficient is not 0, coding information features of the to-be-processed CU corresponding to a specific frame type and coding information features of a neighboring CTU corresponding to the specific frame type of a CTU in which the to-be-processed CU is located, to form prediction feature vector samples; and a model prediction unit 13, configured to input the prediction feature vector samples to a pre-trained predictive model, to obtain a prediction result output from the predictive model, the prediction result being used for indicating whether depth division needs to be performed on the to-be-processed CU, the predictive model being obtained through pre-training by using training samples marked with classification results, and the training samples including coding information features corresponding to the specific frame type.

By using the CU depth determining apparatus provided in one embodiment of this application, the predictive model is pre-trained by using the training samples marked with the classification results. The training samples include coding information features corresponding to the specific frame type. When it is determined that the residual coefficient of the current optimal mode of the to-be-processed CU is not 0, it indicates that the to-be-processed CU is a non-skip CU and coding depth prediction needs to be performed. Coding information features of the specific frame type are obtained from the to-be-processed CU and the neighboring CTU of the CTU in which the to-be-processed CU is located, to form the prediction feature vector samples. The prediction feature vector samples are input to the predictive model, and the machine learning predictive model is used to predict whether depth division needs to be performed on the to-be-processed CU. In this application, when the prediction result indicates that depth division does not need to be performed on the to-be-processed CU, depth division and rdcost calculation and comparison do not need to be performed on the to-be-processed CU. Compared with the existing technology, coding prediction time of this application is significantly reduced, calculation resources are reduced, and calculation complexity is lowered.

Optionally, the residual coefficient determining unit may be specifically configured to determine a residual of a current optimal mode of a to-be-processed CU belonging to a non-I-frame video image.

Optionally, the apparatus in this application may further include:

a coding depth judging unit, configured to determine whether a coding depth of the to-be-processed CU is 0.

Based on the above, the feature obtaining unit is specifically configured to: when a judging result of the coding depth judging unit is that the coding depth of the to-be-processed CU is 0, respectively obtain coding information features of the to-be-processed CU corresponding to a specific frame type and coding information features of a neighboring CTU corresponding to the specific frame type of a CTU in which the to-be-processed CU is located.

Optionally, the apparatus in this application may further include:

a neighbor average cost determining unit, configured to: when it is determined that the coding depth of the to-be-processed CU is not 0, determine an average cost of CUs that are in the neighboring CTU of the CTU in which the to-be-processed CU is located and that have the same coding depth as that of the to-be-processed CU, and use the average cost as a first average cost;

a self average cost determining unit, configured to determine an average cost of coded CUs that are in the CTU in which the to-be-processed CU is located and that have the same coding depth, and use the average cost as a second average cost; and a depth division judging unit, configured to determine whether depth division needs to be performed on the to-be-processed CU according to the first average cost and the second average cost.

Optionally, the predictive model may include a P-frame predictive model and a B-frame predictive model, a training sample used during pre-training of the P-frame predictive model includes coding information features corresponding to the specific frame type extracted from a CU belonging to a P-frame video image, and a training sample used during pre-training of the B-frame predictive model includes coding information features corresponding to the specific frame type extracted from a CU belonging to a B-frame video image. Based on the above, the model prediction unit may include:

a frame type determining unit, configured to determine whether a type of a video frame to which the to-be-processed CU belongs is P-frame or B-frame;

a P-frame model prediction unit, configured to: when the frame type determining unit determines that the type of the video frame to which the to-be-processed CU belongs is P-frame, input the prediction feature vector samples to the P-frame predictive model, to obtain a prediction result output from the P-frame predictive model; and a B-frame model prediction unit, configured to: when the frame type determining unit determines that the type of the video frame to which the to-be-processed CU belongs is B-frame, input the prediction feature vector samples to the B-frame predictive model, to obtain a prediction result output from the B-frame predictive model.

Optionally, the feature obtaining unit may include:

a first feature obtaining unit, configured to obtain a cost, a quantized coefficient, a distortion, and a variance of the to-be-processed CU; and a second feature obtaining unit, configured to obtain a cost and depth information of the neighboring CTU of the CTU in which the to-be-processed CU is located.

Optionally, the neighbor average cost determining unit may include:

a first neighbor average cost determining subunit, configured to determine an average cost of CUs that are in each neighboring CTU of the CTU in which the to-be-processed CU is located and that have the same coding depth as that of the to-be-processed CU;

a second neighbor average cost determining subunit, configured to determine a weight value of each neighboring CTU according to a direction relation between each neighboring CTU and the CTU in which the to-be-processed CU is located; and a third neighbor average cost determining subunit, configured to determine a weighted average cost of all the neighboring CTUs according to the weight value and the average cost of each neighboring CTU, and use the weighted average cost as a first average cost.

Optionally, the depth division judging unit may include:

a cost threshold determining unit, configured to determine a cost threshold according to the first average cost and the second average cost; and a cost threshold comparison unit, configured to determine whether a cost of the current optimal mode of the to-be-processed CU is less than the cost threshold; and determine that depth division does not need to be performed on the to-be-processed CU if the cost of the current optimal mode of the to-be-processed CU is less than the cost threshold; or determine that depth division needs to be performed on the to-be-processed CU if the cost of the current optimal mode of the to-be-processed CU is not less than the cost threshold An embodiment of this application further discloses a video coder. The video coder includes the foregoing described CU depth determining apparatus.

Further, the video coder may further include the foregoing described predictive model. Compared with an existing video coder, the video coder disclosed in this application has a significantly improved coding speed and reduced calculation complexity.

Finally, it should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or further includes inherent elements of the process, method, object, or device. If no more limitations are made, an element limited by "include a/an . . . " does not exclude other same elements existing in the process, the method, the article, or the device which includes the element.

It should be noted that the embodiments in this specification are all described in a progressive manner. Description of each of the embodiments focuses on differences from other embodiments, and reference may be made to each other for the same or similar parts among respective embodiments.

The above description of the disclosed embodiments enables persons skilled in the art to implement or use this application. Various modifications to these embodiments are obvious to persons skilled in the art, the general principles defined in the present disclosure may be implemented in other embodiments without departing from the spirit and scope of this application. Therefore, this application is not limited to these embodiments illustrated in the present disclosure, but needs to conform to the broadest scope consistent with the principles and novel features disclosed in the present disclosure.

What is claimed is:

1. A coding unit (CU) depth determining method, comprising:
    determining, by a computing device, a residual coefficient of a current optimal mode of a target CU;
    forming prediction feature vector samples, by the computing device, according to coding information features of the target CU corresponding to a specific frame type and coding information features of a neighboring coding tree unit (CTU) corresponding to the specific frame type of a CTU in which the target CU is located; and
    inputting, by the computing device, the prediction feature vector samples to a pre-trained predictive model corresponding to the specific frame type, to obtain a prediction result output from the predictive model, the prediction result indicating whether depth division needs to be performed on the target CU, wherein the predictive model including a P-frame predictive model or a B-frame predictive model is obtained through pre-training by using training samples marked with classification results, and the training samples include coding information features corresponding to the specific frame type extracted from a CU belonging to a P-frame video image or a B-frame video image respectively when the predictive model is the P-frame predictive model or the B-frame predictive model, and wherein inputting the prediction feature vector samples to the pre-trained predictive model comprises:
        determining whether a frame type of a video frame to which the target CU belongs is P-frame or B-frame;
        upon determining the frame type of the video frame to which the target CU belongs is P-frame, inputting the prediction feature vector samples to the P-frame predictive model, to obtain the prediction result output from the P-frame predictive model; and
        upon determining the frame type of the video frame to which the target CU belongs is B-frame, inputting the prediction feature vector samples to the B-frame predictive model, to obtain the prediction result output from the B-frame predictive model.

2. The method according to claim 1, further comprising:
    determining whether a coding depth of the target CU is 0; and
    in response to determining that the coding depth of the target CU is 0, performing forming the prediction feature vector samples according to the coding information features of the target CU corresponding to the specific frame type and coding information features of the neighboring coding tree unit (CTU) corresponding to the specific frame type of the CTU in which the target CU is located.

3. The method according to claim 1, further comprising:
    determining whether a coding depth of the target CU is other than 0; and
    in response to determining that the coding depth of the target CU is other than 0, determining a first average cost by using an average cost of CUs that are in the neighboring CTU of the CTU in which the target CU is located and that have the same coding depth as the target CU;
    determining a second average cost by using an average cost of coded CUs that are in the CTU in which the target CU is located and that have the same coding depth as the target CU; and
    determining whether the depth division needs to be performed on the target CU according to the first average cost and the second average cost.

4. The method according to claim 3, wherein the first average cost comprises:
    determining an average cost of CUs that are in each neighboring CTU of the CTU in which the target CU is located and that have the same coding depth as the target CU;
    determining a weight value of each neighboring CTU according to a direction relation between each neighboring CTU and the CTU in which the target CU is located; and
    determining a weighted average cost of all the neighboring CTUs according to the weight value and the average cost of each neighboring CTU, and using the weighted average cost as the first average cost.

5. The method according to claim 3, wherein the determining whether the depth division needs to be performed on the target CU according to the first average cost and the second average cost comprises:
    determining a cost threshold according to the first average cost and the second average cost;
    determining whether a cost of the current optimal mode of the target CU is less than the cost threshold;
    determining that depth division does not need to be performed on the target CU if the cost of the current optimal mode of the target CU is less than the cost threshold; and
    determining that depth division needs to be performed on the target CU if the cost of the current optimal mode of the target CU is greater than or equal to the cost threshold.

6. The method according to claim 1, wherein forming the prediction feature vector samples according to the coding information features of the target CU corresponding to the specific frame type and coding information features of the neighboring coding tree unit (CTU) corresponding to the specific frame type of the CTU in which the target CU is located comprises:
   obtaining a cost, a quantized coefficient, a distortion, and a variance of the target CU; and
   obtaining a cost and depth information of the neighboring CTU of the CTU in which the target CU is located.

7. The method according to claim 1, wherein the training samples include a first portion of training samples with a first classification mark and a second portion of training samples with a second classification mark different than the first classification mark.

8. A coding unit (CU) depth determining apparatus, comprising: a memory; and a processor coupled to the memory and configured to:
   determine a residual coefficient of a current optimal mode of a target CU;
   forming prediction feature vector samples according to coding information features of the target CU corresponding to a specific frame type and coding information features of a neighboring coding tree unit (CTU) corresponding to the specific frame type of a CTU in which the target CU is located; and
   input the prediction feature vector samples to a pre-trained predictive model corresponding to the specific frame type, to obtain a prediction result output from the predictive model, the prediction result indicating whether depth division needs to be performed on the target CU, wherein the predictive model including a P-frame predictive model or a B-frame predictive model is obtained through pre-training by using training samples marked with classification results, and the training samples include coding information features corresponding to the specific frame type extracted from a CU belonging to a P-frame video image or a B-frame video image respectively when the predictive model is the P-frame predictive model or the B-frame predictive model, and wherein inputting the prediction feature vector samples to the pre-trained predictive model comprises:
      determining whether a frame type of a video frame to which the target CU belongs is P-frame or B-frame;
      upon determining the frame type of the video frame to which the target CU belongs is P-frame, inputting the prediction feature vector samples to the P-frame predictive model, to obtain the prediction result output from the P-frame predictive model; and
      upon determining the frame type of the video frame to which the target CU belongs is B-frame, inputting the prediction feature vector samples to the B-frame predictive model, to obtain the prediction result output from the B-frame predictive model.

9. The apparatus according to claim 8, wherein the processor is further configured to:
   determine whether a coding depth of the target CU is 0;
   in response to determining that the coding depth of the target CU is 0, execute forming the prediction feature vector samples according to the coding information features of the target CU corresponding to the specific frame type and coding information features of the neighboring coding tree unit (CTU) corresponding to the specific frame type of the CTU in which the target CU is located.

10. The apparatus according to claim 8, wherein the processor is further configured to:
    determine whether a coding depth of the target CU is other than 0;
    in response to determining that the coding depth of the target CU is other than 0, determine a first average cost by using an average cost of CUs that are in the neighboring CTU of the CTU in which the target CU is located and that have the same coding depth as the target CU;
    determine a second average cost by using an average cost of coded CUs that are in the CTU in which the target CU is located and that have the same coding depth as the target CU; and
    determine whether the depth division needs to be performed on the target CU according to the first average cost and the second average cost.

11. The apparatus according to claim 10, wherein the processor is further configured to:
    determine an average cost of CUs that are in each neighboring CTU of the CTU in which the target CU is located and that have the same coding depth as the target CU;
    determine a weight value of each neighboring CTU according to a direction relation between each neighboring CTU and the CTU in which the target CU is located; and
    determine a weighted average cost of all the neighboring CTUs according to the weight value and the average cost of each neighboring CTU, and use the weighted average cost as the first average cost.

12. The apparatus according to claim 10, wherein the processor is further configured to:
    determine a cost threshold according to the first average cost and the second average cost;
    determine whether a cost of the current optimal mode of the target CU is less than the cost threshold;
    determine that depth division does not need to be performed on the target CU if the cost of the current optimal mode of the target CU is less than the cost threshold; and
    determine that depth division needs to be performed on the target CU if the cost of the current optimal mode of the target CU is greater than or equal to the cost threshold.

13. The apparatus according to claim 8, wherein the processor is further configured to:
    obtain a cost, a quantized coefficient, a distortion, and a variance of the target CU; and
    obtain a cost and depth information of the neighboring CTU of the CTU in which the target CU is located.

14. The apparatus according to claim 8, wherein the training samples include a first portion of training samples with a first classification mark and a second portion of training samples with a second classification mark different than the first classification mark.

15. A non-transitory computer-readable storage medium storing computer program instructions executable by at least one processor to perform:
    determining a residual coefficient of a current optimal mode of a target CU;
    forming prediction feature vector sample according to coding information features of the target CU corresponding to a specific frame type and coding information features of a neighboring coding tree unit (CTU) corresponding to the specific frame type of a CTU in which the target CU is located; and inputting the prediction feature vector samples to a pre-trained predictive model corresponding to the specific frame type, to obtain a prediction result output from the predictive model, the prediction result indicating whether depth division needs to be performed on the target CU, wherein the predictive model including a P-frame predictive model or a B-frame predictive model is obtained through pre-training by using training samples marked with classification results, and the training samples include coding information features corresponding to the specific frame type extracted from a CU belonging to a P-frame video image or a B-frame video image respectively when the predictive model is the P-frame predictive model or the B-frame predictive model, and wherein inputting the prediction feature vector samples to the pre-trained predictive model comprises:

determining whether a frame type of a video frame to which the target CU belongs is P-frame or B-frame;

upon determining the frame type of the video frame to which the target CU belongs is P-frame, inputting the prediction feature vector samples to the P-frame predictive model, to obtain the prediction result output from the P-frame predictive model; and upon determining the frame type of the video frame to which the target CU belongs is B-frame, inputting the prediction feature vector samples to the B-frame predictive model, to obtain the prediction result output from the B-frame predictive model.

16. The storage medium according to claim 15, wherein the computer program instructions further cause the at least one processor to perform:

determining whether a coding depth of the target CU is 0; and in response to determining that the coding depth of the target CU is 0, performing forming the prediction feature vector samples according to the coding information features of the target CU corresponding to the specific frame type and coding information features of the neighboring coding tree unit (CTU) corresponding to the specific frame type of the CTU in which the target CU is located.

17. The storage medium according to claim 15, wherein the computer program instructions further cause the at least one processor to perform:

determining whether a coding depth of the target CU is 0; and in response to determining that the coding depth of the target CU is other than 0, determining a first average cost by using an average cost of CUs that are in the neighboring CTU of the CTU in which the target CU is located and that have the same coding depth as the target CU;

determining a second average cost by using an average cost of coded CUs that are in the CTU in which the target CU is located and that have the same coding depth as the target CU; and determining whether the depth division needs to be performed on the target CU according to the first average cost and the second average cost.

18. The storage medium according to claim 15, wherein the training samples include a first portion of training samples with a first classification mark and a second portion of training samples with a second classification mark different than the first classification mark.

* * * * *